Dec. 29, 1953   W. A. RAY   2,664,267
HYDRAULICALLY BALANCED GATE VALVE STRUCTURE
Filed June 29, 1950   2 Sheets-Sheet 1

WILLIAM A. RAY,
INVENTOR.

BY John Flam
ATTORNEY

WILLIAM A. RAY,
INVENTOR.

BY John Flam
ATTORNEY

Patented Dec. 29, 1953

2,664,267

UNITED STATES PATENT OFFICE 2,664,267

HYDRAULICALLY BALANCED GATE VALVE STRUCTURE

William A. Ray, North Hollywood, Calif., assignor to General Controls Co., a corporation of California Application June 29, 1950, Serial No. 171,069

5 Claims. (Cl. 251—167)

This invention relates to gate valve structures adapted to control liquids under high pressures, such as oil, under pressures of about 3,000 to 5,000 pounds per square inch.

When large valve openings are controlled in this manner, the inlet pressure acting on the gate or slide urges it with a very large force toward the outlet opening. Accordingly, a substantial frictional force is created against the gate seat. This unbalance thus renders it difficult to move the slide or gate to the open position.

It is one of the objects of this invention to provide a gate valve of this character in which the forces on opposite sides of the gate are kept in substantial balance in a simple and inexpensive manner.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings.

Figure 2:
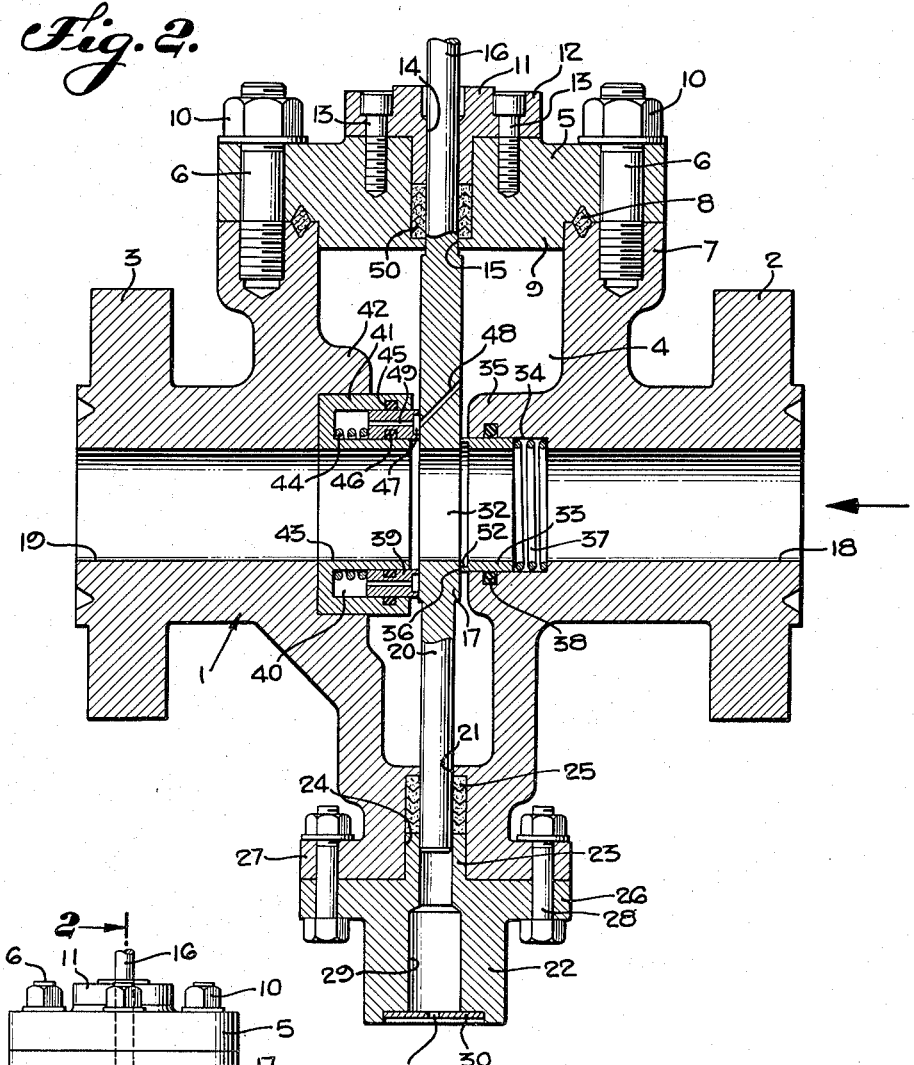
Fig. 2 is an enlarged sectional view, taken along a plane corresponding to line 2—2 of Fig. 1, the valve being shown in open position.
Figure 1:
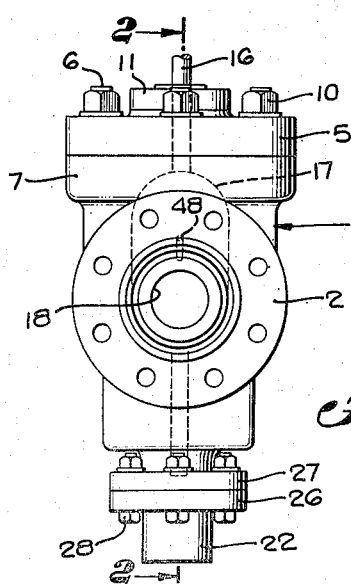
Figure 1 is a side elevation of a valve structure incorporating the invention.

The valve body 1 is provided at its opposite ends with the flanges 2 and 3, by the aid of which the valve body may be attached to cooperating flanges of a pipe line. A chamber 4 is formed in the valve body, said chamber being open at the top. The opening at the top is closed by a cap or head 5, held in place by the aid of the studs 6 threaded into the flange 7 of the body 1. A gasket 8 may be accommodated in conforming annular recesses in the head 5 and the flange 7. The head 5, furthermore, has the inwardly directed projection 9 telescoping within the chamber 4.

The studs 6 pass through appropriate openings in the head 5, and nuts 10 are provided for tightening the head 5 against the flange 7.

A guide sleeve 11 is attached to the top of head 5, as by the aid of flange 12, through which the fastening bolts 13 pass. This guide sleeve telescopes within a recess 14 formed in the cap 5. This recess 14 communicates with an aperture 15 through which a stem 16 projects. This stem is attached to the gate member 17. Packing 50 is disposed in the space below the sleeve 11 and around the stem 16.

The stem 16 is used to slide the gate member 17 to open and closed position, so as to establish or interrupt communication between the inlet passage 18 and the outlet passage 19, which extend transversely of the chamber 4.

The lower end of the gate member 17 is provided with a guiding stem 20. This guiding stem 20 passes through an aperture 21 formed in the body 1, and is guided by the sleeve 22. This sleeve 22 has an extension 23 telescoping within the recess 24 formed in the bottom of the valve body 1. Packing 25 is disposed around the stem 20 and in the recess 24 about the extension 23.

The sleeve 22 is provided with a flange 26 by the aid of which it may be attached to the flange 27 formed at the lower end of the body 1. For this purpose, the bolts 28 are used.

Figure 3:
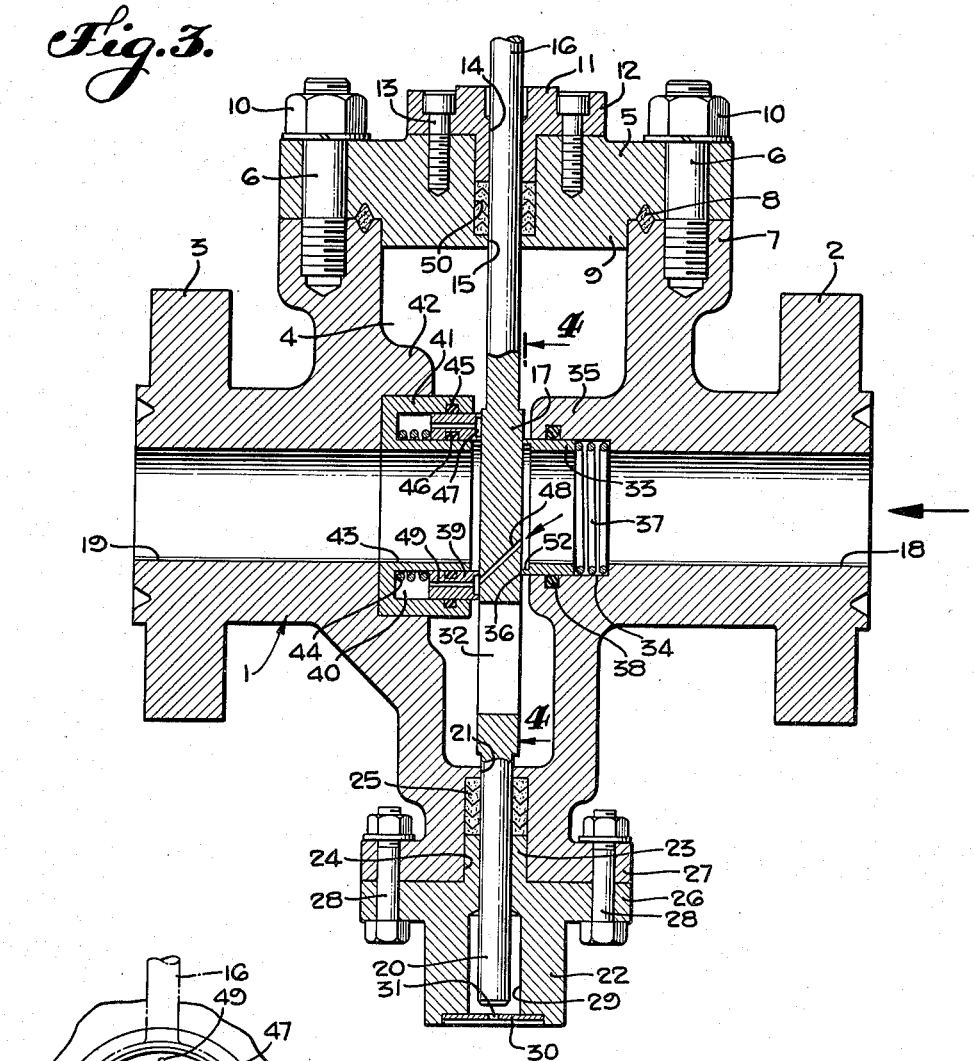
Fig. 3 is a view similar to Fig. 2, but showing the valve in closed position.

The lower end of the sleeve 22 is provided with an enlarged aperture 29 into which the stem 20 projects when the gate 17 is in the closed position of Fig. 3. The lower end of this aperture 20 may be closed by a washer 30 having an aperture 31.

Figure 4:
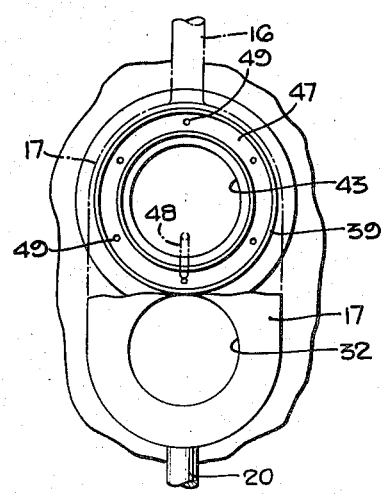
Fig. 4 is a sectional view, taken along a plane corresponding to line 4—4 of Fig. 3, a part of the sliding gate member being shown in phantom lines.

The gate 17 has a through opening 32 (see, particularly, Fig. 4). This through opening or port 32 is adapted to align with the passages 18 and 19 when the valve is in the open position, as shown in Fig. 2. However, when the gate 17 is moved downwardly to the position of Fig. 3, the port 32 is out of alignment with the passages 18 and 19, and the valve is closed.

A port-forming means 33 is slidably arranged within the enlarged counterbore 34 of the passage 18. To accommodate this counterbore 34, the valve body 1 has an inwardly directed boss 35. This port-forming means 33 is shown in the form of a cylinder having a narrow edge 36 urged into sealing contact with the gate 17, as by the aid of a compression spring 37 disposed in the bore 34. An O-ring 38 is disposed in an annular channel in bore 34, and around the port-forming means 33, in order to provide a seal around this member 33.

The left-hand side of the gate 17 is in sliding contact with a port-forming means 39. This port-forming means is in the form of a cylindrical ring telescoping in an annular space 40 formed in an insert or guide 41. This insert or guide 41 is disposed in a boss 42 directed toward the gate 17. Guide 41 has a central aperture 43 aligned with the passage 19.

The port-forming means 39 is urged into sealing contact with the left-hand side of gate 17, as by the compression spring 44 disposed in the recess 40. Sealing rings 45 and 46 are disposed in grooves respectively formed in the member 41 and in the port-forming means 39.

In the closed position of Fig. 3, the gate 17 is subjected to the fluid pressure in the inlet passage 18 over an area defined by the inner annular surface 52 of edge 36. The force on the gate 17 urges it to the left and, if unbalanced, would render it difficult to manipulate the stem 16.

The port-forming member 39 is adapted to overcome this unbalance. The member 39 is provided with an annular recess 47 opening toward the gate. A number of apertures 49 through the member 39 establishes communication between the recess 47 and the chamber 40. The gate 17 is provided with a through oblique aperture or port 48, registrable with the inlet 18 and the recess 47, respectively, when the gate 17 is in its closed position. The fluid pressure of the inlet passage 18 is thereby communicated to the recess 47, apertures 49, and chamber 40.

The fluid pressure in recess 47 acts over the area thereof to impose a force on the gate, tending to urge it to the right. This force is furthermore aided by virtue of fluid pressure in the chamber 40, acting over the difference in projected area of member 39 and recess 47. By proportioning the member 39 so that its projected area is substantially equal to the projected area defined by the annular surface 52, the forces on both sides of the gate 17 are balanced when the gate is in the closed position of Fig. 3. When the valve is in the open position of Fig. 2, the aperture 48 is inactive.

The inventor claims:

1. In a valve structure: a valve body having an inlet and an outlet passageway; a gate guided for slidable movement by said body between said passageways; a guide secured to said body and having a through aperture aligned with said outlet passageway; said guide having a channel opening toward said gate; a gate-contacting member guided for movement in said channel and forming, together with said channel, a chamber; said gate having a through port registrable with said inlet passageway; and passage forming means communicating with said chamber and said gate port when said gate is in closing position.

2. In a valve structure: a valve body having an inlet and an outlet passageway; a gate guided for slidable movement by said body between said passageways; a guide secured to said body and having a through aperture aligned with said outlet passageway; said guide having an annular channel opening toward said gate; and a member having a plane surface contacting said gate and guided for movement in said channel, said gate-contacting member forming, together with said channel, a pressure chamber; said gate-contacting member having a recess opening in said surface, and having a port connecting said recess with said chamber; resilient means urging said gate-contacting member toward said gate; said gate having a port registrable with said recess and said inlet passageway, respectively, when said gate is in closing position.

3. In a valve structure: a valve body having an inlet and an outlet passageway; a gate guided for slidable movement by said body between said passageways; a port-forming member contacting said gate on the inlet side of said gate; a guide secured to said body and having a through aperture aligned with said outlet passageway; said guide having an annular channel opening toward said gate; and a member having a plane surface contacting said gate and guided for movement in said channel, said gate-contacting member forming, together with said channel, a pressure chamber; said gate-contacting member having a recess opening in said surface, and having a port connecting said recess with said chamber; resilient means urging said gate-contacting member toward said gate; said gate having a port registrable with said recess and said inlet passageway, respectively, when said gate is in closing position; the area of said gate contacting member, projected normal to its direction of guided movement, being substantially equal to the area of the port defined by said port-forming means.

4. In a valve structure: a valve body; a gate supported by said body for slidable movement; a first port forming means on one side of said gate and supported by said body for movement toward and away from said gate; a second port forming means on the other side of said gate and aligned with said first port forming means; means urging said first port forming means resiliently against the gate; means guiding said second port forming means for movement toward and away from said gate and forming a chamber on that side of said second port forming means remote from said gate; said second port forming means having an annular recess opening toward the gate; said second port forming means having means connecting said chamber with said annular recess; the gate having means to connect said recess with the port defined by said first port forming means when the gate is in closing position; and means resiliently urging said second port forming means against said gate.

5. In a valve structure: a valve body; a gate supported by said body for slidable movement; a first port forming means on one side of said gate and supported by said body for movement toward and away from said gate; a second port forming means on the other side of said gate and aligned with said first port forming means; means urging said first port forming means resiliently against the gate; means guiding said second port forming means for movement toward and away from said gate and forming a chamber on that side of said second port forming means remote from said gate; said second port forming means having an annular recess opening toward the gate; said second port forming means having means connecting said chamber with said annular recess; the gate having means to connect said recess with the port defined by said first port forming means when the gate is in closing position; and means resiliently urging said second port forming means against said gate; the area of the second port forming means exposed toward the gate being substantially equal to the area defined by said first port forming means.

WILLIAM A. RAY.

References Cited in the file of this patent
UNITED STATES PATENTS

| Number | Name | Date |
|---|---|---|
| 686,703 | Bickford | Nov. 19, 1901 |
| 1,752,456 | Pillatt | Apr. 1, 1930 |

FOREIGN PATENTS

| Number | Country | Date |
|---|---|---|
| 78,439 | Germany | 1894 |
| 560,610 | France | 1923 |